United States Patent [19]

Korenberg

[11] 4,402,665
[45] Sep. 6, 1983

[54] COMBUSTOR AIR GRID

[75] Inventor: Jakob Korenberg, York, Pa.

[73] Assignee: York-Shipley, Inc., York, Pa.

[21] Appl. No.: 176,091

[22] Filed: Aug. 7, 1980

[51] Int. Cl.³ .......................................... F23D 19/02
[52] U.S. Cl. ................................. 431/170; 110/245; 432/58
[58] Field of Search ............... 110/245; 126/163 R, 126/163 A; 431/7, 170; 122/4 D; 432/58

[56] References Cited

U.S. PATENT DOCUMENTS

| | | | |
|---|---|---|---|
| 1,791,509 | 2/1931 | Morrow | 239/565 |
| 2,812,592 | 11/1957 | Knibbs et al. | 432/58 |
| 2,853,370 | 9/1958 | Downing | 23/288 |
| 3,397,657 | 8/1968 | Tada | 110/8 |
| 3,540,388 | 11/1970 | Smith et al. | 110/8 |
| 3,752,224 | 8/1973 | Sproul | 165/47 |
| 3,776,150 | 12/1973 | Evans et al. | 110/8 R |
| 4,060,041 | 11/1977 | Sowards | 110/8 F |
| 4,062,656 | 12/1977 | Blaser et al. | 48/73 |
| 4,167,918 | 9/1979 | Atabay | 122/4 D |
| 4,177,742 | 12/1979 | Uemura et al. | 110/346 |

Primary Examiner—Carroll B. Dority, Jr.
Attorney, Agent, or Firm—Finnegan, Henderson, Farabow, Garrett & Dunner

[57] ABSTRACT

A combustor grid for use in an incinerator having air bars for distribution of fluidizing air. Air is distributed from a source of pressurized air to a configuration of air bars in fluid communication with each other. Each air bar in the grid has an upper surface with air injection ports and side walls which converge toward the bottom surface. The air injectors may be refractory covered metal tubes on a conduit or individual air nozzles.

4 Claims, 5 Drawing Figures

COMBUSTOR AIR GRID

BACKGROUND OF THE INVENTION

The present invention is a grate in the shape of a grid for use in a combustion vessel. It is particularly useful in a fluidized bed in which the material combusted is non-uniform and subject either to agglomeration or to having tramp material entrained.

In incinerators, combustion chambers or fluidized bed reactor vessels, various means have been used for supporting the combustible material or the fluidized bed. The two major types of grates which are prevalent are bar grates and plate grates.

A bar grate is designed to allow air to flow up through the burning bed of material and to allow ash and tramp material to be removed from the bottom of the bed. The ash and tramp material, as well as bed material, pass through the spaces between the bars. This type of grate normally has an air manifold which distributes air to individual bars connected to the manifold. Each air bar has air nozzles for dispersing fluidizing air into the bed material.

A plate grate does not allow fluidized bed and/or tramp material to pass through the plate. Rather, the plate which is in the form of a flat or cone-shaped solid surface has air nozzles connected to perforations in it to expel air and maintain a fluidized bed above the grate. Air is supplied from an air box beneath the perforated plate or cone.

Both of these grates have certain disadvantages which can limit the operating time of a fluidized bed. The bar grate, despite having spaces between bars through which ash, tramp material and agglomerated material can fall, tends to accumulate material which is too large to pass through the gaps between adjacent bars. Thus, after a period of operation, the upper surface of the grid becomes covered by tramp material and fluidization of the bed decreases. The loss of fluidization creates a loss in the effectiveness of the unit.

In a plate grate system, a similar problem occurs to an even greater extent. There is no means by which tramp material or agglomerated bed material can be removed from the entire upper surface of the grate other than by shutting down the bed completely to remove such material.

The individual nozzles used in these systems account for a major portion of the cost of the grates. Elimination or simplification of the nozzles would have a significant effect on reducing the cost of the grate.

SUMMARY OF THE INVENTION

The present invention overcomes problems arising in the conventional plate and bar grate systems where build-up of tramp material can cause the shutdown of a fluidized bed combustor system.

In accordance with the present invention, the air grid for use within a fluidized bed reactor includes a main air collector which communicates with a source of pressurized air located outside of the reactor and a grid of primary air bars located within the reactor. The grid of primary air bars is preferably arranged perpendicular to the air collector and each primary air bar has openings for communication with the air collector. Intermediate air bars are arranged parallel to the air collector and each intermediate air bar is connected with each primary air bar crossing it. Each primary air bar and intermediate air bar has downwardly converging side walls and air dispersion ports on their upper surface.

A significant feature of this invention is the use of primary and intermediate air bars having downwardly converging side walls joined to an upper surface. The effect of constructing a grid from a series of air bars, each having side walls which downwardly converge, is to create gaps between bars which are progressively larger toward the bottom of the gate. Thus, tramp material reaching the upper surface of the grate need pass only one point of contact before falling through. This arrangement minimizes the likelihood of a build-up of tramp or agglomerated material on the upper surface of the grate and prevents particles from jamming between the side walls of the bars.

In addition to use of air bars with downward convergent side walls in the grid of the present invention, these bars can also be incorporated into conventional bar grates.

The construction of a grid from intersecting air bars also provides improved fluidization of bed material because air dispersion is more uniform across the entire area of the bed than in prior art plate or bar grates.

In addition, the invention incorporates into the upper surface of each air bar a series of air dispersion ports to inject air into a fluidized bed. These ports are covered by a metal conduit attached to the upper surface of the air bar. A series of air injectors are attached to the side walls of the air conduit. This metal conduit is covered by a refractory material. The air injectors are angled downwardly from the conduit toward the outside of the refractory material. The downward slope and the length of the air injectors provides for a lesser incidence of clogging with bed material when the bed is in a slumped condition, As an additional benefit, this type of air injector is much less expensive than the usual system of air nozzles each of which is fitted to an air dispersion port in a manifold.

DESCRIPTION OF THE PREFERRED EMBODIMENTS

Reference will now be made in detail to the present preferred embodiments of the apparatus of the invention, examples of which are illustrated in the accompanying drawings.

Figure 1:
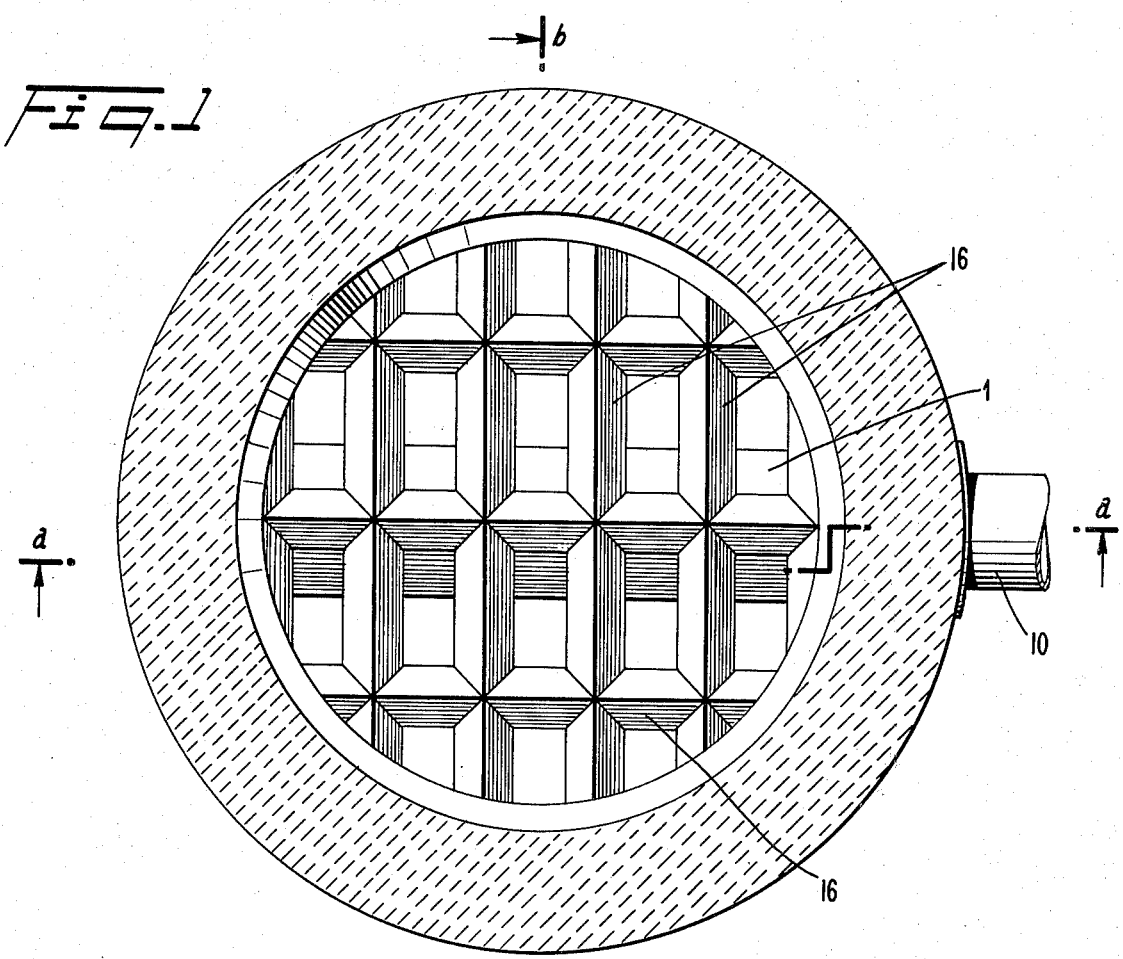
FIG. 1 is a view of an air bar grid system having a main air collector, primary air bars and intermediate air bars, in accordance with the invention.
Figure 2:
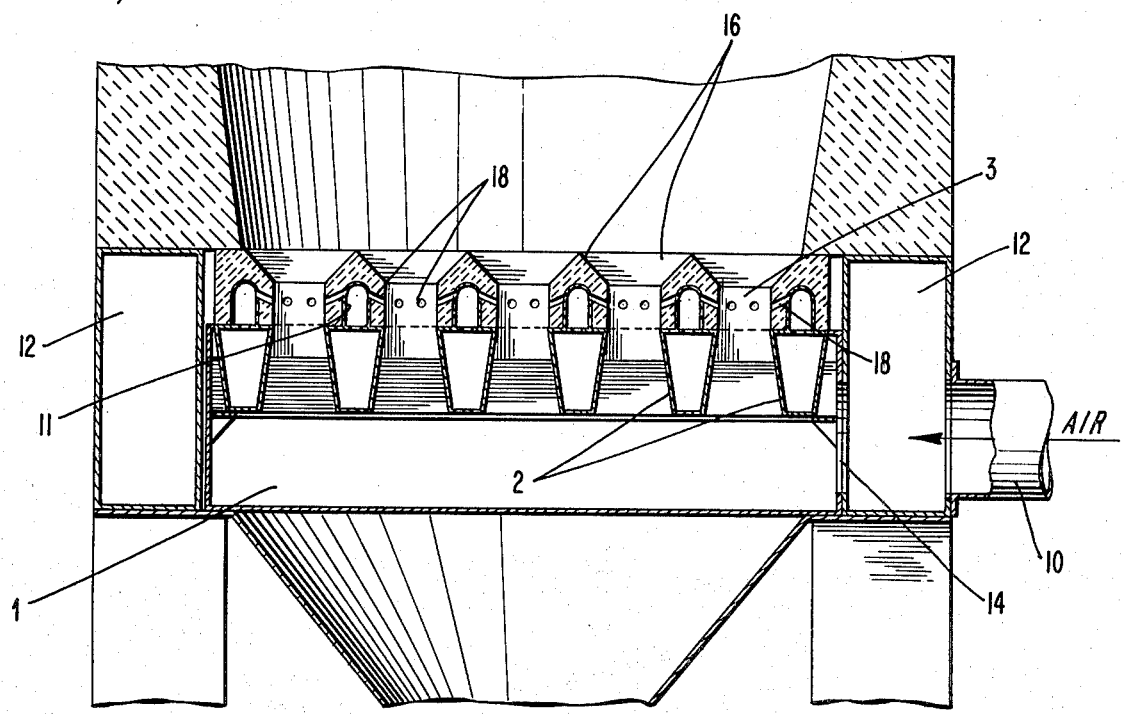
FIG. 2 is a cross-sectional view along line a—a of FIG. 1 showing the annular air chamber, primary air bars, refractory covering over a conduit and air injectors on each bar.
Figure 3:
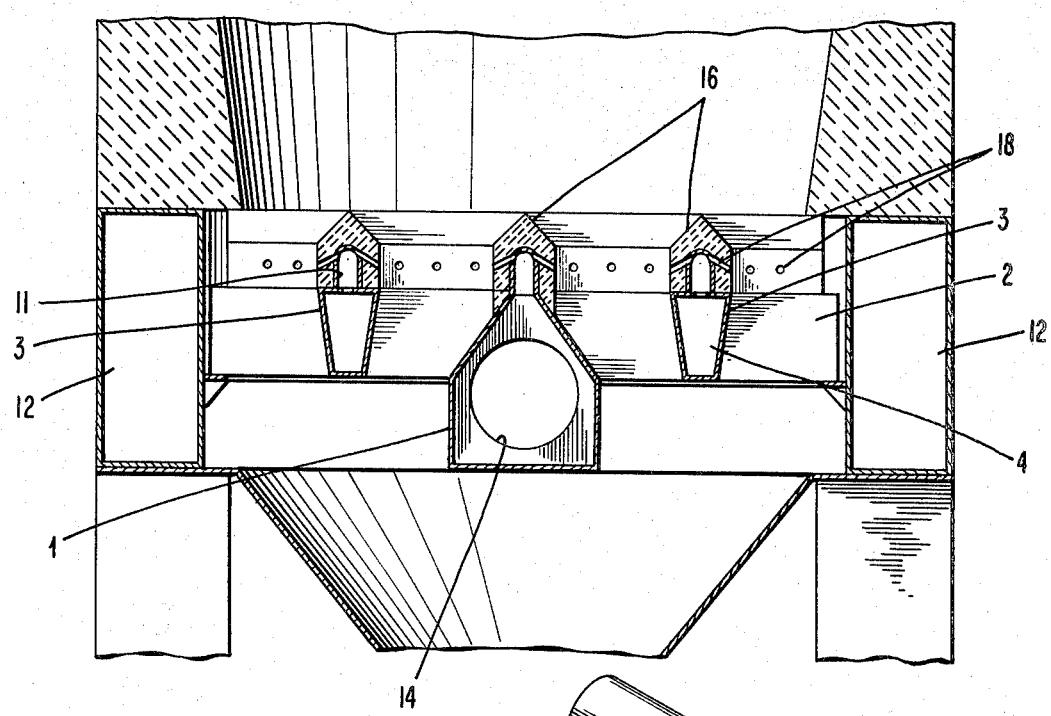
FIG. 3 is a cross-sectional view along line b—b of FIG. 1 showing intermediate air bars, the main air collector and the annular air chamber.

As herein embodied and most clearly depicted in FIGS. 1, 2, and 3, air enters the combustor grid through an air duct 10 which is in fluid communication with a source of pressurized air located outside of the reactor (not shown) and an annular air chamber 12. Air from chamber 12 is provided to main air collector 1 through orifice 14. As shown in FIG. 3, the main air collector 1 is located beneath the grid surface. Each of the primary air bars 2 is bisected by the main air collector 1. Air from the main air collector 1 is introduced into the primary air bars 2 and the primary air bars 2 each communicates with the intermediate air bars 3 to introduce air.

In order to create a grid system, the intermediate air bars 3 are parallel to the main air collector and perpendicular to each of the primary air bars. The intermediate and primary air bars lie in the same plane and intersect each other at right angles. The intersections form fluid tight joints between the bars and between the primary air bars and the main air collector for air dispersion throughout the grid.

The size of the spacing between the air bars and the air carrying capacity of the bars is important in determining the operation of the fluidized bed. Sufficient space should be left between the bars to allow for passage of the largest sized tramp material normally encountered in the wastes being combusted; however, the spaces should not be so large that it is difficult to create a fluidized bed above the grid. The internal dimensions of the hollow air bars must be sufficiently large to carry the volume of the air necessary to fluidize the bed material being supported by each bar grid.

FIG. 2 shows the primary and intermediate air bars intersecting primary air bars in cross-section. A refractory covering 16 on the upper surface of the primary and intermediate air bars and the main air collector has air injector ports 18 angled downwardly from a central air conduit 11 for expulsion of the fluidizing air. This means for injecting fluidizing air into the bed is much more economical than is the use of air dispersion nozzles individually affixed on the upper surface of the air bars. In the embodiment shown, the refractory material has a central conduit 11 into which air can enter from dispersion ports on the upper surface of the air bar, such as port 30 shown in FIG. 4. The air in conduit 11 can be dispersed along the length of the conduit and into the downwardly angled air injectors 18 distributed along the length of conduit 11 and refractory covering 16. However, it is also practical, although more expensive, to connect to the upper surface of the primary and intermediate air bars individual nozzles 40 of a type which are known in the art as shown in FIG. 5.

Figure 4:
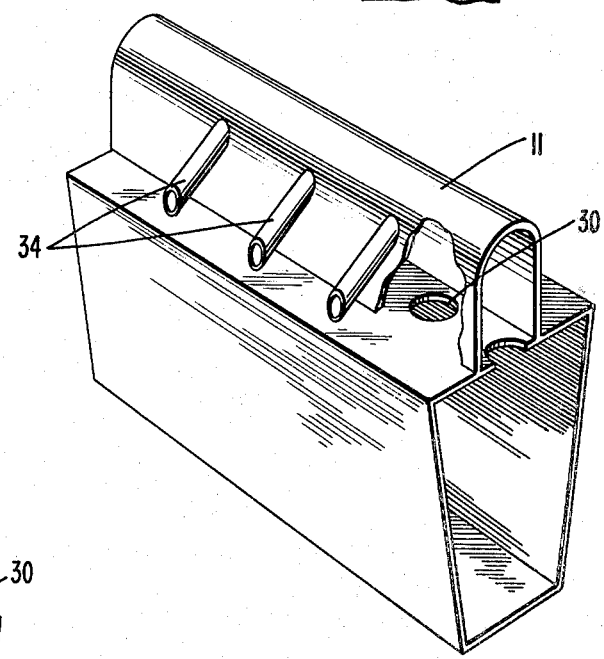
FIG. 4 is a sectional view, partly broken away, of an air bar showing its air dispersion ports capped by a conduit having downwardly directed air injectors for air distribution.
Figure 5:
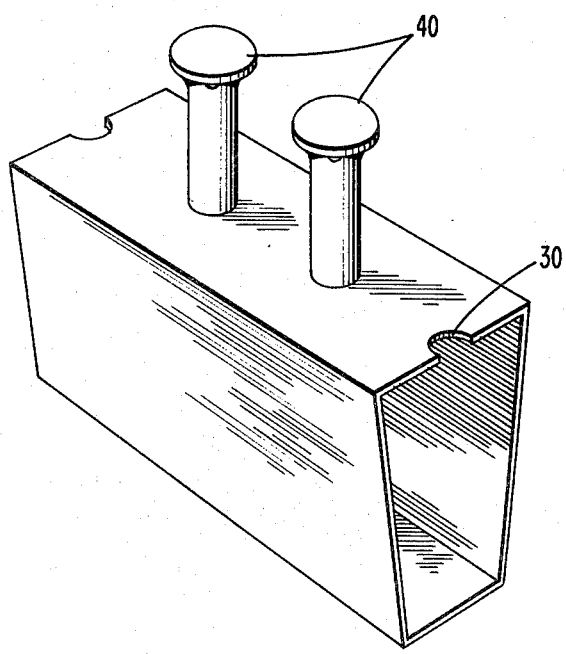
FIG. 5 is a sectional view showing an air bar with air nozzles affixed to the upper surface.

The air bar as shown in FIG. 4 without its refractory covering has openings 30 on its upper surface to permit release of air into conduit 11. The conduit may be made of metal or other material resistant to high temperatures. Air flowing through conduit 11 is dispersed through downwardly angled air injectors 34 arranged along the length of conduit 11.

As can be seen quite clearly in FIGS. 2 and 3, the sides of each air bar converge downwardly. This arrangement creates a space between adjacent air bars in the grid which becomes progressively wider toward the bottom surface of the air bars. Such an arrangement permits any tramp material which falls against the upper surface of the grid to pass more easily through the spaces between bars. It also reduces the amount of clogging of tramp material between bars since such material will fall clearly through the grate once passing the narrowest area at the upper surface of the grate.

It is intended that modifications and variations of the above embodiments can be made within the scope of the invention as defined by the appended claims and their equivalents.

What is claimed is:

1. An air bar grid for use within a fluidized bed reactor comprising:
 a main air collector in fluid communication with a source of pressurized air;
 a grid of primary air bars perpendicular to said main air collector, each primary air bar having an upper surface and being connected along its length for fluid communication with said main air collector;
 intermediate air bars parallel to said main air collector, each intermediate air bar having an upper surface and being connected along its length for fluid communication with each primary air bar intersecting said intermediate air bars;
 each primary air bar and intermediate air bar having downward convergent side walls and having air dispersion ports on the upper surface; and
 said primary air bars and intermediate air bars having a refractory covering on the upper surface, said covering having a central air conduit and air injectors.

2. The apparatus of claim 1 wherein said air injectors are angled downwardly from said central air conduit to the outside of said refractory covering.

3. The apparatus of claim 1 wherein said main air collector bisects said primary air bars.

4. An air bar grid for use within a fluidized bed reactor comprising:
 a main air collector in fluid communication with a source of pressurized air;
 a grid of primary air bars perpendicular to said main air collector, each primary air bar having an upper surface and being connected along its length for fluid communication with said main air collector;
 intermediate air bars parallel to said main air collector, each intermediate air bar having an upper surface and being connected along its length for fluid communication with each primary air bar intersecting said intermediate air bars;
 each primary air bar and intermediate air bar having downward convergent side walls and having air dispersion ports on the upper surface; and
 said primary and intermediate air bars being capped by conduits, said conduits having downwardly directed air injectors spaced along their length.

* * * * *